United States Patent
Ramachandran et al.

(10) Patent No.: US 10,731,457 B2
(45) Date of Patent: Aug. 4, 2020

(54) WELLBORE ANALYSIS USING TM01 AND TE01 MODE RADAR WAVES

(71) Applicant: Saudi Arabian Oil Company, Dhahran (SA)

(72) Inventors: Sunder Ramachandran, Sugar Land, TX (US); Aydin Babakhani, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 358 days.

(21) Appl. No.: 15/625,415

(22) Filed: Jun. 16, 2017

(65) Prior Publication Data

US 2018/0010441 A1 Jan. 11, 2018

Related U.S. Application Data

(60) Provisional application No. 62/358,953, filed on Jul. 6, 2016.

(51) Int. Cl.
*E21B 47/04* (2012.01)
*G01S 13/88* (2006.01)
*G01F 23/284* (2006.01)

(52) U.S. Cl.
CPC ............ *E21B 47/042* (2013.01); *E21B 47/04* (2013.01); *G01F 23/284* (2013.01); *G01S 13/88* (2013.01)

(58) Field of Classification Search
CPC ...... E21B 47/04; E21B 47/042; G01F 23/284; G01S 13/88
USPC ....................................................... 342/124
See application file for complete search history.

(56) References Cited

U.S. PATENT DOCUMENTS

| 4,135,397 | A | | 1/1979 | Krake |
| 4,621,264 | A | | 11/1986 | Yashiro et al. |
| 5,877,997 | A | * | 3/1999 | Fell ..................... G01F 23/2962 367/908 |

(Continued)

FOREIGN PATENT DOCUMENTS

| EP | 1218762 A1 | 7/2002 |
| WO | WO2000077531 A1 | 12/2000 |
| WO | WO2001042746 A1 | 6/2001 |

OTHER PUBLICATIONS

Ebihara et al., "Analysis of a guided wave along a conducting structure in a borehole," (XP055401319) Geophysical Prospecting, vol. 46, No. 5, Sep. 1, 1998; pp. 489-505.

(Continued)

*Primary Examiner* — Timothy X Pham
(74) *Attorney, Agent, or Firm* — Fish & Richardson P.C.

(57) ABSTRACT

A method of wellbore analysis using TM01 and TE01 modes of radar waveforms can include transmitting, at a first time, a radar waveform from a wellhead into a tubing disposed in a wellbore positioned in a reservoir. The radar waveform is either a TM01 mode or a TE01 mode waveform. The tubing includes a fluid, and the surface of the wellbore includes the wellhead. At a second time, a reflected waveform generated by reflecting the transmitted radar waveform on a fluid surface of the fluid is received at the wellhead. A fluid level of the fluid is determined based on the time difference between the first time and the second time, and on a transmission speed of the radar waveform from the wellhead to the fluid surface. The fluid level is a distance between the wellhead and the fluid surface of the fluid.

13 Claims, 4 Drawing Sheets

(56) References Cited

U.S. PATENT DOCUMENTS

| | | | |
|---|---|---|---|
| 6,237,410 B1* | 5/2001 | Dyck | E21B 47/042 367/118 |
| 6,405,136 B1* | 6/2002 | Li | H03M 7/30 702/10 |
| 6,525,540 B1* | 2/2003 | Kong | G01S 7/03 324/338 |
| 6,657,440 B1 | 12/2003 | Amini | |
| 6,766,141 B1 | 7/2004 | Briles et al. | |
| 7,046,164 B2 | 5/2006 | Gao et al. | |
| 7,311,001 B2 | 12/2007 | Liu et al. | |
| 8,271,212 B2 | 9/2012 | Sai | |
| 8,794,063 B2 | 8/2014 | Miskell et al. | |
| 10,132,922 B2* | 11/2018 | Fericean | G01S 13/32 |
| 2002/0053239 A1* | 5/2002 | Fehrenbach | G01F 23/284 73/290 V |
| 2002/0095987 A1* | 7/2002 | Lutke | G01F 23/284 73/290 V |
| 2006/0086497 A1 | 4/2006 | Ohmer et al. | |
| 2006/0137446 A1* | 6/2006 | Wennerberg | G01F 23/284 73/290 V |
| 2007/0024750 A1 | 2/2007 | Wing Chung et al. | |
| 2012/0084055 A1 | 4/2012 | Smithson | |
| 2014/0124210 A1 | 5/2014 | Dowell | |
| 2015/0086152 A1 | 3/2015 | Samson et al. | |
| 2015/0346376 A1 | 12/2015 | Fouda et al. | |
| 2016/0115784 A1 | 4/2016 | Littleford et al. | |
| 2017/0222294 A1* | 8/2017 | Shinohara | H01P 5/082 |

OTHER PUBLICATIONS

International Search Report and Written Opinion issued in International Application No. PCT/US2017/038468 dated Sep. 8, 2017; 12 pages.

Gulf Cooperation Council Examination Report issued in GCC Application No. GC 2017-33657 dated Apr. 28, 2019, 4 pages.

Tantawi et al., "Evaluation of the TE12 Mode in Circular Waveguide for Low-Loss, High Power RF Transmission," Pysical Review Special Topics—Accelerators and Beams, vol. 3, No. 8, Aug. 2000; pp. 1-21.

Tantawi, "A Novel Circular TE01-Mode Bend for Ultra-High-Power Applications," Journal of Electromagnetic Waves and Applications, vol. 18, No. 12, Jan. 2004; pp. 1679-1687.

* cited by examiner

WELLBORE ANALYSIS USING TM01 AND TE01 MODE RADAR WAVES

CROSS REFERENCE TO RELATED APPLICATIONS

This application claims priority to U.S. Application Ser. No. 62/358,953 filed on Jul. 6, 2016, the entire contents of which is hereby incorporated by reference.

TECHNICAL FIELD

This disclosure is related to wellbore analysis using electromagnetic waves.

BACKGROUND

In hydrocarbon resource recovery, it can be useful to monitor various conditions in a wellbore such as a fluid level of a hydrocarbon liquid which may be hundreds or thousands of feet below the wellbore surface. Typically, a tubing is disposed in the wellbore for transporting the hydrocarbon liquid. Metal loss due to corrosion or precipitation due to scale, wax or asphaltene deposition may occur to the interior of the tubing.

SUMMARY

The present disclosure describes wellbore analysis using TM01 and TE01 mode radar waves.

In some aspects, a method of wellbore analysis includes transmitting, at a first time and from a wellhead, a radar waveform into a tubing disposed in a wellbore positioned in a reservoir, where the radar waveform is at least one of a TM01 mode or TE01 mode waveform, the tubing comprising a fluid, and the surface of the wellbore comprising the wellhead; receiving, at a second time and at the wellhead, a reflected waveform generated by reflecting the transmitted radar waveform on a fluid surface of the fluid; determining a time difference between the first time and the second time; and determining a fluid level of the fluid based on the time difference and on a transmission speed of the radar waveform from the wellhead to the fluid surface, where the fluid level is a distance between the wellhead and the fluid surface of the fluid.

This, and other aspects, can include one or more of the following features. The fluid comprises a hydrocarbon liquid. The radar waveform is a TM01 mode waveform having a frequency above 3 GHz or a TE01 mode waveform having a frequency above 4 GHz. The tubing extends from the surface of the wellbore to the fluid surface and has a circular cross section. Transmitting the radar waveform into the tubing includes transmitting the radar waveform using the tubing as a circular waveguide. The method can also include determining a pressure distribution in the reservoir based, in part, on the time difference. Determining the pressure distribution in the reservoir can include measuring a surface pressure at the surface of the wellbore, determining a pressure of the wellbore at the fluid surface, determining a pressure at a bottom of the reservoir, and determining the pressure distribution based on the surface pressure, the pressure of the wellbore at the fluid surface and the pressure at the bottom of the reservoir. Determining the pressure at the bottom of the reservoir can include determining a depth of the reservoir from the fluid surface, and determining a static pressure head between the fluid surface and the bottom of the reservoir. The method can also include determining a sub-surface location in the tubing that comprises a defect. In some cases, the reflected waveform includes a first portion reflected by the fluid surface and a second portion reflected by the defect. Determining the sub-surface location of the defect in the tubing can include identifying, in the reflected waveform, the second portion reflected by the defect, determining a third time at which the second portion was received at the surface, and determining the sub-surface location of the defect.

In some aspects, a system can include a transmitter, a receiver, and a controller. The transmitter is configured to transmit, at a first time and from a wellhead, a radar waveform into a tubing disposed in a wellbore positioned in a reservoir. The radar waveform is at least one of a TM01 mode or TE01 mode waveform. The tubing comprises a fluid, and the surface of the wellbore comprises the wellhead. The receiver is configured to receive, at a second time and at the wellhead, a reflected waveform generated by reflecting the transmitted radar waveform on a fluid surface of the fluid. The controller is configured to determine a time difference between the first time and the second time. The controller is also configured to determine a fluid level of the fluid based on the time difference and on a transmission speed of the radar waveform from the wellhead to the fluid surface, where the fluid level is a distance between the wellhead and the fluid surface of the fluid.

This, and other aspects, can include one or more of the following features. The fluid comprises a hydrocarbon liquid. The radar waveform is a TM01 mode waveform having a frequency above 3 GHz or a TE01 mode waveform having a frequency above 4 GHz. The tubing extends from the surface of the wellbore to the fluid surface and has a circular cross section. Transmitting the radar waveform into the tubing includes transmitting the radar waveform using the tubing as a circular waveguide. The controller is also configured to determine a pressure distribution in the reservoir based, in part, on the time difference. Determining the pressure distribution in the reservoir can include measuring a surface pressure at the surface of the wellbore, determining a pressure of the wellbore at the fluid surface, determining a pressure at a bottom of the reservoir, and determining the pressure distribution based on the surface pressure, the pressure of the wellbore at the fluid surface and the pressure at the bottom of the reservoir. The controller is also configured to determine a sub-surface location in the tubing that comprises a defect. In some cases, the reflected waveform includes a first portion reflected by the fluid surface and a second portion reflected by the defect. Determining the sub-surface location of the defect in the tubing can include identifying, in the reflected waveform, the second portion reflected by the defect, determining a third time at which the second portion was received at the surface, and determining the sub-surface location of the defect. In some implementations, the controller includes a computer system comprising a memory and a hardware processor.

In some aspects, a non-transitory, computer-readable medium stores one or more instructions executable by a computer system to perform operations of well analysis including transmitting, at a first time and from a wellhead, a radar waveform into a tubing disposed in a wellbore positioned in a reservoir, where the radar waveform is at least one of a TM01 mode or TE01 mode waveform, the tubing comprising a fluid, and the surface of the wellbore comprising the wellhead; receiving, at a second time and at the wellhead, a reflected waveform generated by reflecting the transmitted radar waveform on a fluid surface of the fluid; determining a time difference between the first time and the second time; and determining a fluid level of the fluid based on the time difference and on a transmission speed of the radar waveform from the wellhead to the fluid surface, where the fluid level is a distance between the wellhead and the fluid surface of the fluid.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The present disclosure describes determinations of a liquid level, pressure survey, and defect depth using TM01 and TE01 mode electromagnetic (EM) radar waves. TM01 or TE01 mode radar wave can propagate in a waveguide with very low losses if a frequency of the radar wave is above a cutoff frequency of the waveguide.

To measure a liquid level of a hydrocarbon liquid in a wellbore, a conductive tubing inside the wellbore may serve as a waveguide to propagate the TM01 or TE01 radar wave if the radar wave has a frequency above a cutoff frequency of the conductive tubing. The liquid level can be determined by measuring a time difference between a transmitting time of the radar waveform and a receiving time of a reflection of the radar waveform reflected by the hydrocarbon liquid. The liquid level can also be used to perform a pressure survey in the reservoir. In addition, defects in the tubing due to corrosion or scales can reduce conductivity and attenuate the reflected waveform. Attenuation losses and time delays of the reflected waveforms can be used to determine locations of defects and internal roughness of the tubing.

The described approach can determine a fluid level of a hydrocarbon liquid in a wellbore, perform a pressure survey, and assessing downhole corrosion and scale conditions using a surface device that does not go downhole. The surface device can avoid a use of costly caliper logs and gauge cutters that can get caught in heavily scaled wells or be difficult to use in sour wells where operation has to be cognizant of dangers of hydrogen sulfide. The described approach can also determine a fluid level of a long distance, such as hundreds or thousands of feet, from the wellbore surface. TM01 and TE01 radar waves of a frequency higher than a cutoff frequency of a waveguide can travel extremely long distances with little signal attenuations. In some implementations, the described approach can enable an effective batch treatment with chemicals for gas wells. By knowing the hydrocarbon liquid level during the batch treatment, the chemicals can fall to the liquid level and then immediately bring back to prevent damages to formations.

Figure 1:
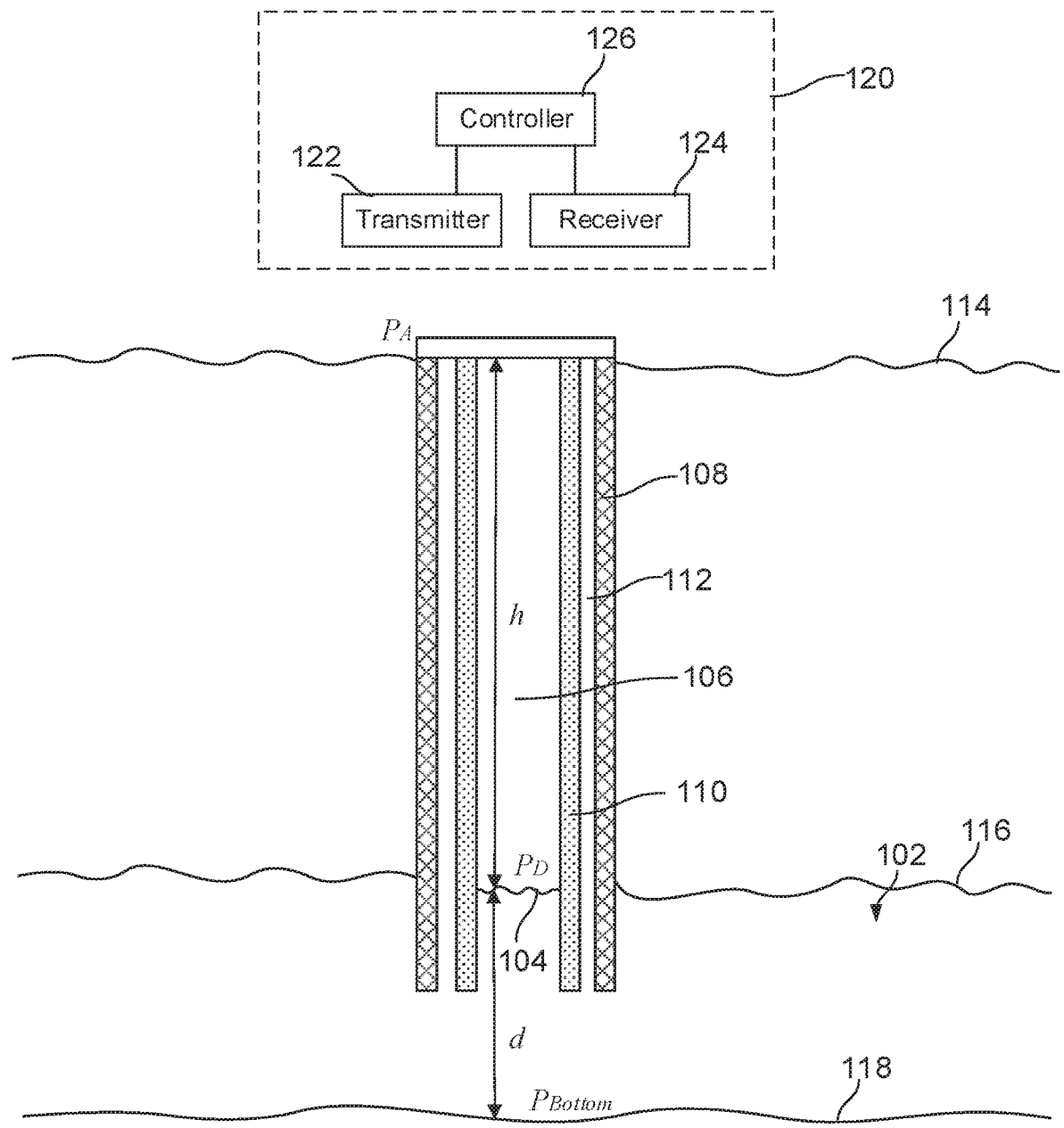
FIG. 1 a schematic diagram of an example of a well system that includes a tool system for measuring various conditions related to the well system.

FIG. 1 is a schematic diagram of an example of a well system 100 that includes a tool system 120 for measuring various conditions related to the well system. FIG. 1 illustrates a reservoir 102 that can include one or more formations, or a portion of a formation, that holds one or more hydrocarbon fluids. The reservoir 102 can include a geographical area to be drilled or being drilled for hydrocarbons or that has been drilled, and from which hydrocarbons are to be produced or are being produced. In some implementations, a wellbore 106 can have been drilled in the reservoir 102. The wellbore 106 can be a production wellbore or an injection wellbore into which injection fluid is to be injected for secondary or tertiary production in an adjacent production wellbore (not shown). All or portions of the wellbore 106 can have been cased with a casing 108 which extends from a wellbore surface 114 shortly into the Earth. The wellbore 106 can also include a tubing 110 disposed within the casing 108, and an annulus 112 can be formed between the casing 108 and the tubing 110. In some implementations, the hydrocarbon fluids in the reservoir 102 can be transported to the wellbore surface 114 using the tubing 110. The tubing 110 can provide a redundant barrier and shield the casing 108 from corrosive well fluids. As shown in FIG. 1, a hydrocarbon fluid or a portion of a hydrocarbon fluid can be in the tubing 110 with a fluid surface 104. Typically, the casing 108 and the tubing 110 have a circular cross section. However, it is possible for the casing 108 and the tubing 110 to have a cross section of other shapes.

The tool system 120 can include a transmitter 122 and a receiver 124 connected to a controller 126. The controller 126 can include a computer system with a memory and a hardware processor. The transmitter 122 and receiver 124 can be located at the same level as the wellbore surface 114 or at a sub-surface level, for example, at a location in the wellbore below the surface 114. The tool system 120 can be configured to determine a level of the fluid surface 104 that is a distance between the surface 114 and the fluid surface 104. The transmitter 122 can transmit a radar waveform, such as a TM01 or TE01 mode waveform, into the tubing 110. The propagation medium for the radar waveform can be free of liquid, for example, can be gas only. The tubing 110 can serve as a waveguide to propagate the TM01 or TE01 mode waveform into the reservoir 102 through the wellbore 106. The receiver 124 can receive a reflected waveform generated by reflecting the transmitted radar waveform on the fluid surface 104. The controller 126 can determine a time difference between the time transmitting the radar waveform and the time receiving the reflected waveform. The level of the fluid surface 104 can be determined based on the time difference and a transmission speed of the radar waveform. For example, if the transmitter 122 and the receiver 124 are at a substantially same location at the wellbore surface level, the controller 126 can determine the fluid level by using $$h = \frac{T_{diff} C_1}{2}, \tag{1}$$

where h is the fluid level (that is, the distance between the surface 114 and the fluid surface 104), $T_{diff}$ the time difference between the time transmitting the radar waveform and the time receiving the reflected waveform, $C_1$ is the transmission speed of the radar waveform, and the term $T_{diff} C_1$ represents a total distance from the transmitter to the fluid surface and back to the receiver at the surface (that is, a double distance between the wellbore surface and the fluid surface). In some implementations, $C_1$ can be smaller than the speed of light and is equal to $2.9979 \times 10^8$ m/sec.

In some implementations, the transmitter 122 and the receiver 124 can be at a substantially same sub-surface location below the wellbore surface level. If a distance between the wellbore surface 114 and the sub-surface location of the transmitter and receiver is known and denoted as $h_1$, the controller 126 can determine the fluid level by using $$h = \frac{T_{diff} C_1}{2} + h_1, \quad (2)$$

where $T_{diff}$ is the time difference between the time transmitting the radar waveform and the time receiving the reflected waveform, and $C_1$ is the transmission speed of the radar waveform (for example, $2.9979 \times 10^8$ m/sec), and the term $$\frac{T_{diff} C_1}{2}$$

represents a distance between the fluid surface and the sub-surface location of the transmitter and receiver.

In some implementations, the transmitter 122 and the receiver 124 can be at different sub-surface locations. For example, both the transmitter 122 and the receiver 124 are in the wellbore below the wellbore surface 114 and distances from the wellbore surface to the transmitter and receiver are denoted as $h_{TX}$ and $h_{RX}$, respectively. If $h_{TX} < h_{RX}$, that is, the transmitter is closer to the wellbore surface level than the receiver, the controller 126 can determine the fluid level by using $$h = \frac{T_{diff} C_1 + (h_{RX} - h_{TX})}{2} + h_{TX}, \quad (3)$$

where $T_{diff}$ is the time difference between the time transmitting the radar waveform and the time receiving the reflected waveform, and $C_1$ is the transmission speed of the radar waveform, for example, $2.9979 \times 10^8$ meters/second (m/s), and the term $$\frac{T_{diff} C_1 + (h_{RX} - h_{TX})}{2}$$

represents a distance between the fluid surface and the transmitter. Similarly, if $h_{TX} > h_{RX}$, that is, the receiver is closer to the wellbore surface level than the transmitter, the controller 126 can determine the fluid level by using $$h = \frac{T_{diff} C_1 + (h_{TX} - h_{RX})}{2} + h_{RX}. \quad (4)$$

In some implementation, the transmitter 122 transmits the radar waveform into the tubing 110 that serves as a waveguide to propagate the radar waveform. To allow the radar wave waveform to propagate in the tubing, the radar wave needs to operate at a frequency above the waveguide cutoff frequency. The radar waveform cannot be propagated through the waveguide if the operating frequency is below the cutoff frequency. For a circular tubing (that is, a circular waveguide), the cutoff frequencies for TM01 and TE01 mode are given by $$f_{c,TM01} = \frac{2.405 C}{2 \pi r} \quad (5)$$

and $$f_{c,TE01} = \frac{3.832 C}{2 \pi r}, \quad (6)$$

respectively, where $f_{c,TM01}$ and $f_{c,TE01}$ are cutoff frequencies in Hertz (Hz), C is the speed of light $3 \times 10^8$ m/s, and r is the internal radius of the tubing in meters.

Figure 2:
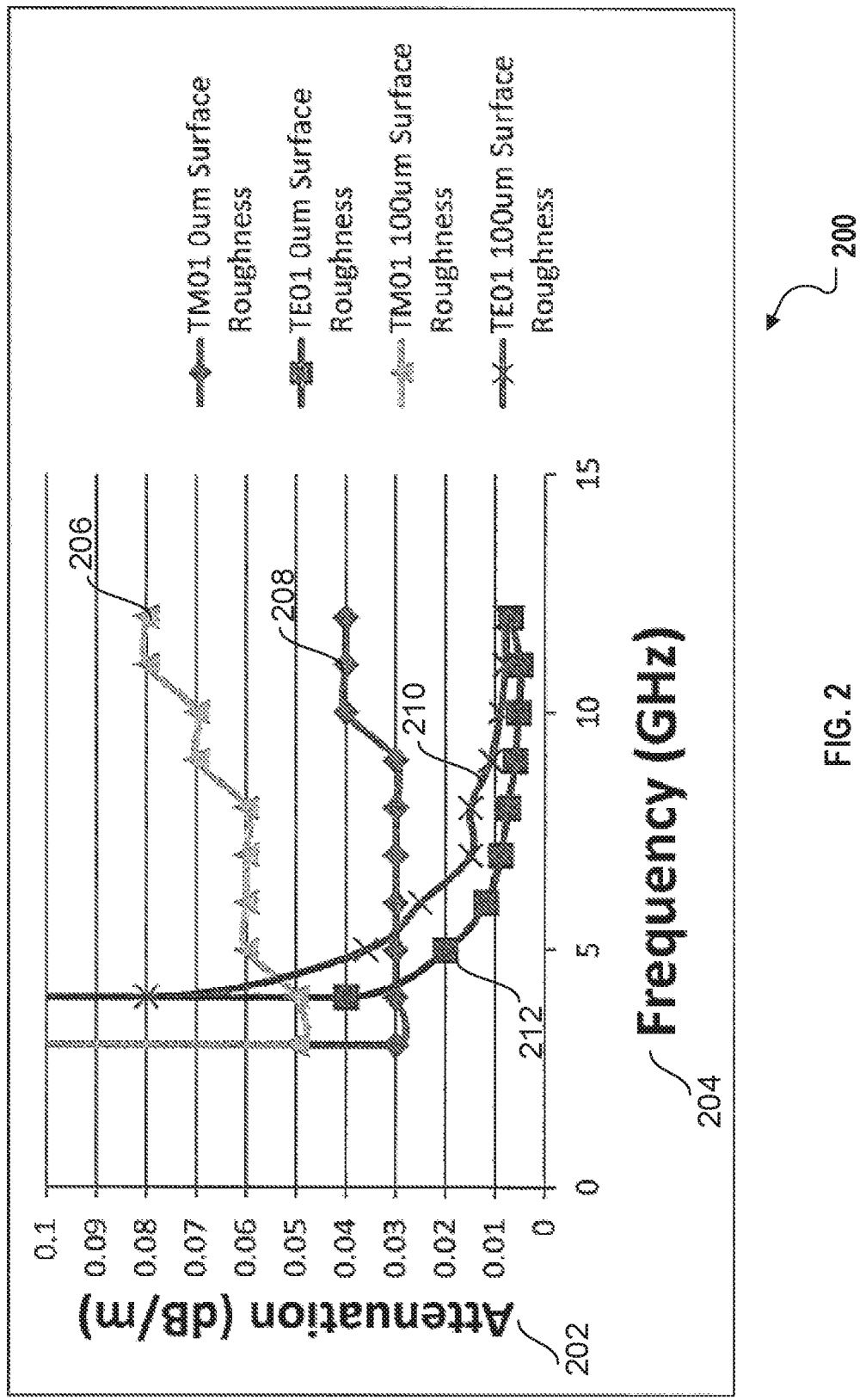
FIG. 2 illustrates signal propagation losses of TE01 and TM01 mode radar waves at different frequencies for a tubing of a 4-inch internal diameter.

One advantage of using TM01 or TE01 mode radar waveform is the low signal propagation loss. FIG. 2 illustrates signal propagation losses 200 of TE01 and TM01 mode radar waves at different frequencies 204 for a tubing of a 4-inch internal diameter. The signal propagation loss can be represented as attenuation 202 in unit of decibels/meter (dB/m). Generally, the interior surface of the tubing is substantially smooth. That is, the interior surface includes a continuous surface with no discontinuities. In some cases, however, the interior surface of the tubing may not be smooth because of metal loss due to corrosive well fluids or precipitation due to scale, wax, or asphaltene deposition. Curves 208 and 212 illustrate signal attenuations for a smooth tubing (that is, 0 micrometer internal surface roughness) at different frequencies for TM01 and TE01 mode, respectively. Curves 206 and 210 illustrate signal attenuations for a tubing of 100 micrometers roughness at the interior surface and at different frequencies for TM01 and TE01 mode, respectively. Based on equations (5) and (6), the cutoff frequencies for a 4-inch internal diameter tubing are 2.3 Gigahertz (GHz) and 3.5 GHz for TM01 and TE01 mode, respectively. As illustrated in FIG. 2, the curves 206 and 208 for TM01 mode show an infinite attenuation below a frequency about 3 GHz. Similarly, the curves 210 and 212 for TE01 mode show an infinite attenuation below a frequency about 4 GHz. FIG. 2 also illustrates that TE01 mode has lower attenuations than TM01 mode, for example, at frequencies higher than about 6 GHz. Curve 212 demonstrates that the lowest attenuation loss can be achieved by TE01 mode at about 11 GHz frequency, where the corresponding attenuation loss is about $8 \times 10^{-3}$ dB/m. This implies that a distance of 12,500 meters would cause a signal loss of 100 dB. In other words, a TE01 mode waveform at about 11 GHz can be used to detect a fluid level of 6,250 meters (that is, a total round-trip distance of 12,500 meters) if the transmitted signal is strong enough, for example, 100 dB stronger than a desired signal level of the receiving reflected signal. In a real system there could be additional loss due to bends and joints in the tubing. For example, the bends can cause additional transmission losses of 0.14 dB.

Turning back to FIG. 1, the tool system 120 can also be used to determine a pressure distribution in the reservoir 102 (for example, a pressure distribution between the reservoir surface 116 and the reservoir bottom 118) based on the level of the fluid surface 104. For example, as shown in FIG. 1, a pressure $P_A$ at the wellbore surface 114 can be measured. Based on the determined fluid level h and the surface pressure $P_A$, the controller 126 can determine a pressure $P_D$ at the fluid surface 104. Further, a depth d of the reservoir between the fluid surface 104 and the bottom of the reservoir 118 can be determined. Based on the depth d, the controller 126 can determine a pressure $P_{Bottom}$ at the bottom of the reservoir 118 using $$P_{Bottom} = \rho g d + P_D \quad (7),$$

where $\rho$ is density of the fluid in unit of kilograms/meter$^3$ (kg/m$^3$), and g is acceleration due to gravity in unit of meters/second$^2$ (m/s$^2$). Typically, g is equal to 9.81 m/s$^2$. In some implementations, the controller 126 can determine a static pressure head between the fluid surface 104 and the bottom of the reservoir 118, and further determine the pressure $P_{Bottom}$ using $$P_{Bottom} = \rho g \psi + P_D \quad (8),$$

where $\psi$ is the static pressure head in unit of meters. Based on the surface pressure $P_A$, fluid surface pressure $P_D$, and reservoir bottom pressure $P_{Bottom}$, the controller 126 can determine a pressure distribution in the reservoir, for example, by performing a linear interpolation.

As discussed earlier, the interior of the tubing 110 may experience metal loss due to corrosion or precipitation due to scale deposition. The metal loss may cause the inner diameter of the tubing 110 to become larger than normal and the precipitation cause the inner diameter smaller than normal. In some implementations, the tool system 120 may also be used to detect a change in the thickness of the tubing 110 and determine locations of defects due to metal loss or precipitation.

For example, the reflected waveforms arrived at the receiver 124 can include a waveform reflected directly from the fluid surface 104, as well as a waveform reflected by the fluid surface and further reflected by a defect on the tubing. The waveform further reflected by the defect may take extra time to arrive at the receiver 124 because of a longer traveling path. Further, the defect caused by corrosion or scales is not conductive and does not act as a waveguide as the tubing does. Hence, additional signal attenuation can be introduced when the waveform reflected from the defect. In some cases, the amount of additional signal attenuation can depend on the thickness of the corrosion or scales. In other words, the waveform received at the receiver 124 can be a sum of multiple copies of the transmitted waveform, each copy having its own time delay and signal attenuation. The first copy received may represent the waveform reflected directly by the fluid surface, and a copy received at a later time may represent a waveform reflected by a defect due to a longer travelling path. In some cases, there could be multiple defects at different locations in the tubing and waveforms reflected by different defects may arrive at the receiver at different times.

By analyzing the time delay or signal attenuation or both associated with the waveform reflected by a defect, the location or thickness (or roughness) or both of the defect may be determined. For example, after determining a receiving time of the waveform reflected by a defect, associated time delay can be determined by comparing the receiving time and the signal transmitting time. Based on the time delay, the length of the signal path associated with the waveform reflected by the defect can be calculated, which may be further used to determine a location of the defect. Further, the additional attenuation of the waveform reflected by the defect may be determined by comparing to the attenuation of the waveform reflected directly from the fluid surface. The additional attenuation may be used to determine a thickness of the defect, which could indicate a severity of the corrosion or scale. In case of multiple defects in the tubing, time delay or signal attenuation or both of each waveform reflected from a defect can be analyzed to determine the location and thickness of the corresponding defect.

In some implementations, the transmitter 122 and receiver 124 can be placed at a fitting at a Christmas tree or a bend beyond the Christmas tree of a hydrocarbon production equipment. The receiver 124 or the controller 126 or both can be equipped with a time domain analyzer to analyze time delays and signal attenuations of the received waveforms.

EXAMPLE

Figure 3:
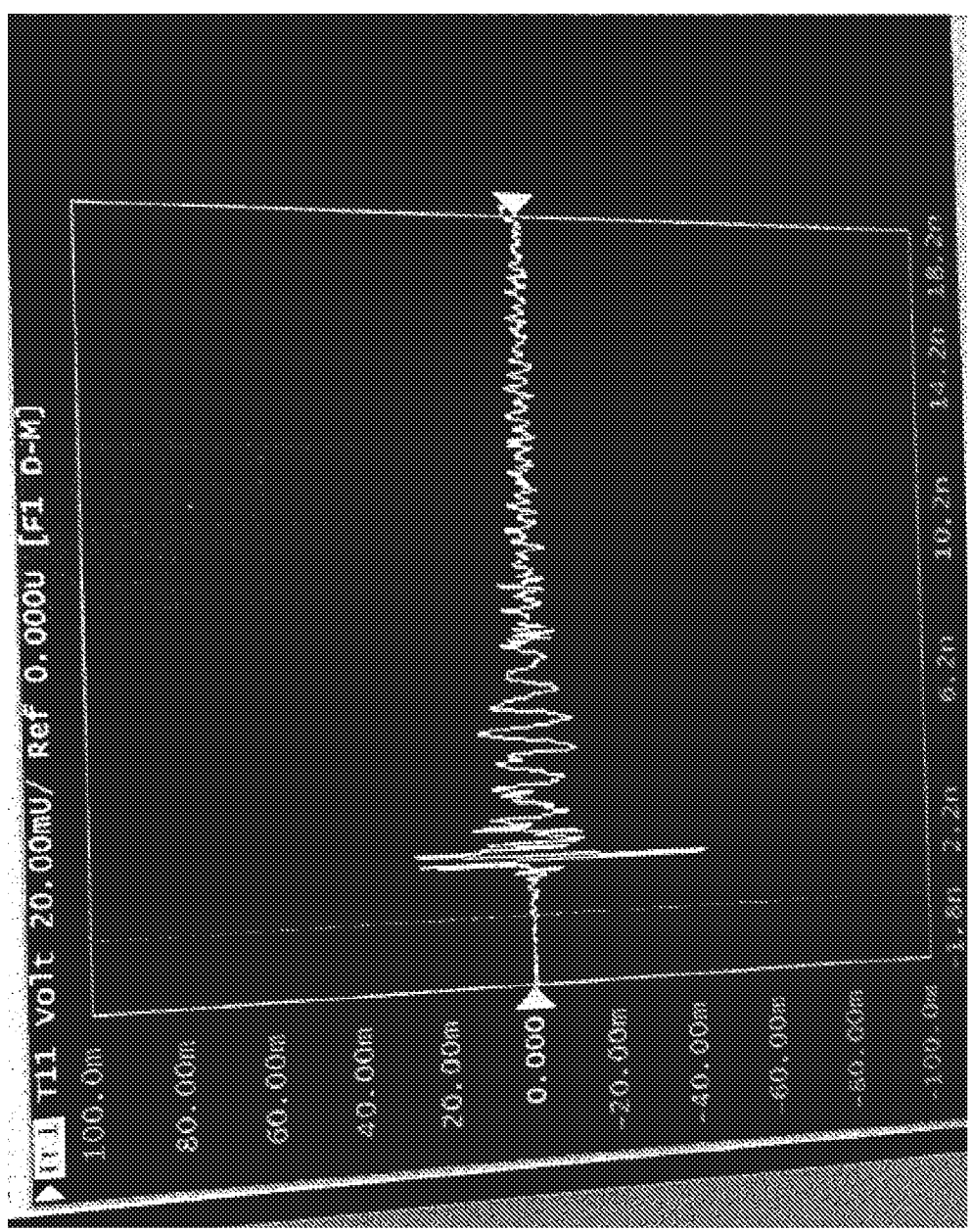
FIG. 3 illustrates a received reflected waveform.

The described approach for determining a liquid level has been demonstrated in a lab environment. A broadband high frequency transmitter/receiver is held by a cable over a tube and water is introduced in the tube. FIG. 3 illustrates a received reflected waveform 300. It can be observed that the signal is transmitted at a time −1.8 nanoseconds and the reflected signal is received at a time 2.2 nanoseconds. The time delay between the transmitted signal and the received signal is 4 nanoseconds. Based on equation (1), the liquid surface is 0.6 meters away from the transmitter/receiver.

Figure 4:
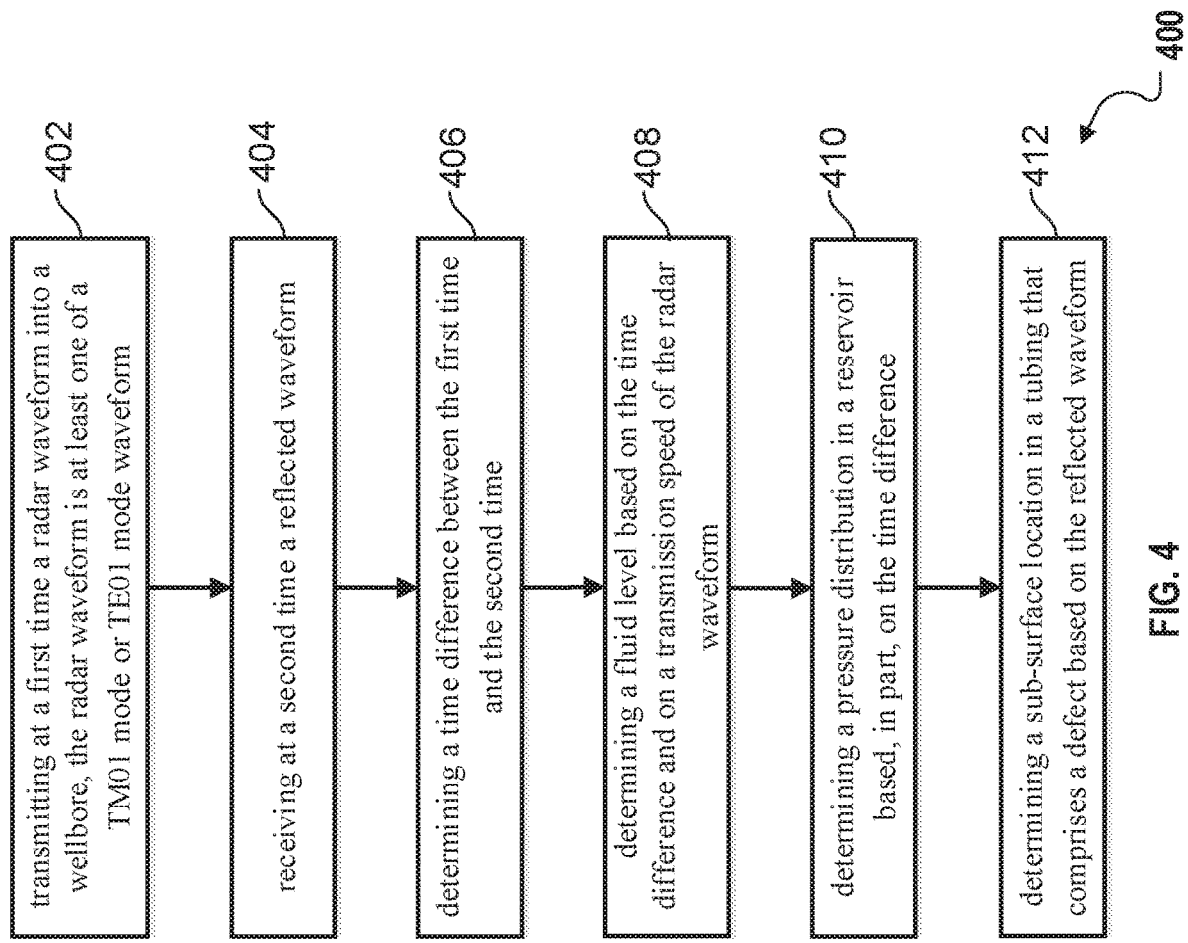
FIG. 4 is a flowchart of an example method for determining a liquid level, pressure survey, and defect depth using TM01 and TE01 mode radar waves.

FIG. 4 is a flowchart of an example method 400 for determining a liquid level, pressure survey, and defect depth using TM01 and TE01 mode radar waves. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, a transmitter transmits, at a first time, a TM01 or TE01 mode radar waveform into a wellbore. In some implementations, the wellbore can include a cylindrical tubing serving as a circular waveguide to propagate the TM01 or TE01 waveform. For the radar waveform to propagate in the waveguide, the waveform frequency has to be above a cutoff frequency of the waveguide. For a cylindrical tubing, the cutoff frequency depends on the tubing internal radius and can be determined based on equations (5) and (6) for TM01 and TE01, respectively. In some implementations, a tubing of other shapes may be used, for example, a tubing of a rectangular cross section can serve as a rectangular waveguide. From 402, method 400 proceeds to 404.

At 404, the receiver receives, at a second time, a reflected waveform that is generated by reflecting the transmitted radar waveform on a fluid surface. From 404, method 400 proceeds to 406.

At 406, the controller can determine a time difference between the first time and the second time, that is, a time difference between the time sending the waveform at 402 and the time receiving the reflected waveform at 404. From 406, method 400 proceeds to 408.

At 408, the controller can determine a fluid level based on the time difference obtained at 406 and a transmission speed of the radar waveform. The fluid level determination can also depend on the locations of the transmitter and the receiver. In some implementations, the transmitter and the receiver can be at a substantially same location at the wellbore surface level, and the fluid level can be determined based on equation (1). In some implementations, the transmitter and the receiver can be at a substantially same sub-surface location below the wellbore surface level, and the fluid level can be determined based on equation (2). In some other implementations, the transmitter and the receiver can be at different sub-surface locations in the wellbore. If the transmitter is at a sub-surface location closer to the wellbore surface level than the receiver, equation (3) can be used to determine the fluid level. Otherwise, equation (4) can be used. From 408, method 400 proceeds to 410.

At 410, the controller can determine a pressure distribution in the reservoir based on the time difference determined at 406 (or the fluid level determined at 408). For example, a surface pressure at the wellbore surface can be measured first. Based on the fluid level and the surface pressure, the controller can determine a pressure of the wellbore at the fluid surface. The controller can further determine a depth of the reservoir from the fluid surface and determine a static pressure head between the fluid surface and the bottom of the reservoir. The controller can determine a pressure at the bottom of the reservoir based on the depth of the reservoir or the static pressure head or both using equation (7) or (8). Finally, the controller determines a pressure distribution in the reservoir based on the surface pressure, the pressure of the wellbore at the fluid surface, and the pressure at the bottom of the reservoir, for example, using linear interpolation. From 410, method 400 proceeds to 412.

At 412, the controller can determine a sub-surface defect location in the tubing based on the reflected waveforms received at 404. The defect caused by metal loss due to corrosion or precipitation due to scale deposition can change the thickness of the tubing. The received reflected waveforms can include the waveform reflected directly from the fluid surface as well as the waveform reflected by the fluid surface and further reflected by a defect on the tubing. The waveform further reflected by the defect may take extra time to arrive at the receiver because of a longer traveling path. Further, the defect caused by corrosion or scales is not conductive and introduces additional signal attenuation to the waveform reflected by the defect. The controller can analyze the time delay or signal attenuation or both associated with the waveform reflected by the defect and determine a location and thickness of the defect. From 412, method 400 stops.

As will be understood by those of ordinary skill in the art, 410 can be an optional step or can be run in parallel with 408 or 412 or both. Similarly, 412 can be an optional step or can be run in parallel with 408 or 410 or both.

Thus, particular implementations of the subject matter have been described. Other implementations are within the scope of the following claims.

The invention claimed is:

1. A method, comprising:
   transmitting, at a first time and from a computing device at a wellhead, a radar waveform into a tubing disposed in a wellbore positioned in a reservoir, wherein the radar waveform is a TM01 mode having a frequency above 3 GHz, the tubing comprising a fluid, and a surface of the wellbore comprising the wellhead;
   receiving, at a second time and the computing device at the wellhead, a reflected waveform generated by reflecting the transmitted radar waveform on a fluid surface of the fluid;
   determining, by the computing device, a time difference between the first time and the second time;
   determining, by the computing device, a fluid level of the fluid based on the time difference and on a transmission speed of the radar waveform from the wellhead to the fluid surface, wherein the fluid level is a distance between the wellhead and the fluid surface of the fluid; and
   determining a pressure distribution in the reservoir based, in part, on the time difference, wherein determining the pressure distribution comprises:
      measuring a surface pressure at the surface of the wellbore;
      determining a pressure of the wellbore at the fluid surface;
      determining a pressure at a bottom of the reservoir; and
      determining the pressure distribution in the reservoir based on the surface pressure, the pressure of the wellbore at the fluid surface and the pressure at the bottom of the reservoir.

2. The method of claim 1, wherein the fluid comprises a hydrocarbon liquid.

3. The method of claim 1, wherein the tubing extends from the surface of the wellbore to the fluid surface, the tubing has a circular cross section, and wherein transmitting the radar waveform into the tubing comprises transmitting the radar waveform using the tubing as a circular waveguide.

4. The method of claim 1, wherein determining the pressure at the bottom of the reservoir comprises:
   determining a depth of the reservoir from the fluid surface; and determining a static pressure head between the fluid surface and the bottom of the reservoir.

5. The method of claim 1, further comprising determining a sub-surface location in the tubing that comprises a defect.

6. The method of claim 5, wherein the reflected waveform comprises a first portion reflected by the fluid surface and a second portion reflected by the defect, wherein determining the sub-surface location in the tubing comprises:
   identifying, in the reflected waveform, the second portion reflected by the defect;
   determining a third time at which the second portion was received at the surface; and
   determining the sub-surface location of the defect in the tubing.

7. A system, comprising:
   a transmitter configured to transmit, at a first time and from a wellhead, a radar waveform into a tubing disposed in a wellbore positioned in a reservoir, wherein the radar waveform is a TM01 mode having a frequency above 3 GHz, the tubing comprising a fluid, and a surface of the wellbore comprising the wellhead;
   a receiver configured to receive, at a second time and at the wellhead, a reflected waveform generated by reflecting the transmitted radar waveform on a fluid surface of the fluid; and
   a controller configured to:
      determine a time difference between the first time and the second time;
      determine a fluid level of the fluid based on the time difference and on a transmission speed of the radar waveform from the wellhead to the fluid surface, wherein the fluid level is a distance between the wellhead and the fluid surface of the fluid; and
      determine a pressure distribution in the reservoir based, in part, on the time difference, wherein determining the pressure distribution comprises:
         measuring a surface pressure at the surface of the wellbore;
         determining a pressure of the wellbore at the fluid surface;
         determining a pressure at a bottom of the reservoir; and determining the pressure distribution in the reservoir based on the surface pressure, the pressure of the wellbore at the fluid surface and the pressure at the bottom of the reservoir.

8. The system of claim 7, wherein the fluid comprises a hydrocarbon liquid.

9. The system of claim 7, wherein the tubing extends from the surface of the wellbore to the fluid surface, the tubing has a circular cross section, and wherein transmitting the radar waveform into the tubing comprises transmitting the radar waveform using the tubing as a circular waveguide.

10. The system of claim 7, wherein the controller is further configured to determine a sub-surface location in the tubing that comprises a defect.

11. The system of claim 10, wherein the reflected waveform comprises a first portion reflected by the fluid surface and a second portion reflected by the defect, wherein determining the sub-surface location in the tubing comprises:
   identifying, in the reflected waveform, the second portion reflected by the defect;
   determining a third time at which the second portion was received at the surface; and
   determining the sub-surface location of the defect in the tubing.

12. The system of claim 7, wherein the controller comprises a computer system comprising a memory and a hardware processor.

13. A non-transitory, computer-readable medium storing one or more instructions executable by a computer system to perform operations comprising:

transmitting, at a first time and from a wellhead, a radar waveform into a tubing disposed in a wellbore positioned in a reservoir, wherein the radar waveform is a TM01 mode having a frequency above 3 GHz, the tubing comprising a fluid, and a surface of the wellbore comprising the wellhead;

receiving, at a second time and at the wellhead, a reflected waveform generated by reflecting the transmitted radar waveform on a fluid surface of the fluid;

determining a time difference between the first time and the second time; and determining a fluid level of the fluid based on the time difference and on a transmission speed of the radar waveform from the wellhead to the fluid surface, wherein the fluid level is a distance between the wellhead and the fluid surface of the fluid; and determining a pressure distribution in the reservoir based, in part, on the time difference, wherein the determining the pressure distribution comprises:

measuring a surface pressure at the surface of the wellbore;

determining a pressure of the wellbore at the fluid surface;

determining a pressure at a bottom of the reservoir; and determining the pressure distribution in the reservoir based on the surface pressure, the pressure of the wellbore at the fluid surface and the pressure at the bottom of the reservoir.

* * * * *